UNITED STATES PATENT OFFICE.

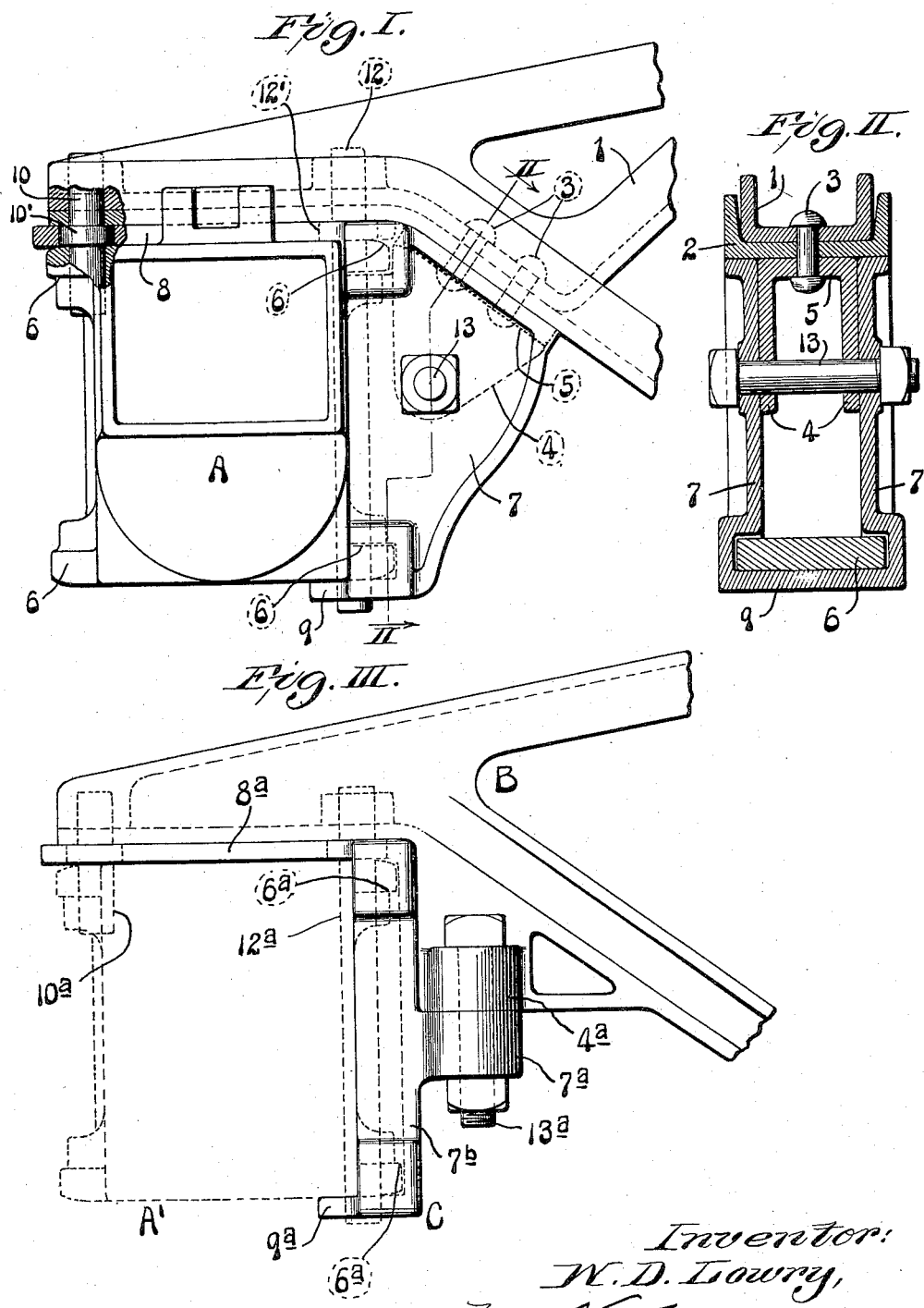

WILLIAM D. LOWRY, OF ST. LOUIS, MISSOURI.

MEANS FOR SECURING JOURNAL-BOXES TO CAR-TRUCK FRAMES.

1,175,465.  Specification of Letters Patent. Patented Mar. 14, 1916.

Application filed December 20, 1915. Serial No. 67,795.

*To all whom it may concern:*

Be it known that I, WILLIAM D. LOWRY, a citizen of the United States of America, a resident of the city of St. Louis, State of Missouri, have invented certain new and useful Improvements in Means for Securing Journal-Boxes to Car-Truck Frames, of which the following is a full, clear, and exact description, reference being had to the accompanying drawing, forming a part of this specification.

My invention relates to improvements in car trucks, and more specifically stated, to means for securing journal boxes to car truck frames.

One of the objects of the invention is to produce a strong and simple fastening device of this kind which is so constructed that the journal box may be easily applied to or removed from the truck frame.

The preferred form of the invention is so constructed that the wheels and axles may be removed from the truck by removing a few simple fastening devices and then lifting the truck frame a slight distance to release the journal boxes therefrom.

The new device preferably includes a journal box holder secured to the journal box and truck frame at several different points, thereby insuring a very strong connection between the journal box and truck frame.

The journal box may be removed by removing one of the fastening devices and then lifting the truck frame from the journal box holder, thus releasing all of the fastenings from the truck frame.

Another object of the invention is to produce a device of this kind adapted to be applied to a Master Car Builders' journal box.

Figure I is a front elevation, partly in section, illustrating a portion of a truck frame and a journal box secured thereto. Fig II is a section taken approximately on line II—II, Fig. I. Fig. III is a view similar to Fig. I, illustrating a modification.

The truck frame shown in Figs. I and II comprises a compression member 1, a tension member 2, and rivets 3 connecting said members. The tension member is a channel beam, and the compression member is a casting seated between the flanges of said channel beam. The truck frame is provided with an extension consisting of a pair of wings 4 and a web 5 uniting said wings, said extension being secured to the truck frame by means of the rivets 3.

A designates a journal box, of the Master Car Builders' type, having the usual lugs 6 at its sides. These lugs are provided with the usual vertical openings.

The journal box holder comprises a pair of side wings 7 located at one side of the journal box, an upper extension 8 formed integral with said side wings and located between the top of the journal box and a portion of the truck frame. The journal box holder is also provided with a lower extension 9 which lies below the journal box.

10 designates a vertical pin passing through the member 8 of the journal box holder and fitted to the journal box and truck frame. This pin is provided with a collar 10' which lies between the top of the journal box and the truck frame.

12 designates a comparatively long pin passing through the lugs 6 at one side of the journal box and provided with a collar 12' which lies between the top of the journal box and the truck frame. These pins are inserted into the usual vertical openings at the sides of the journal box. Both of the pins extend upwardly from the top of the journal box so as to secure the journal box holder and journal box to the truck frame, and the long pin 12 extends downwardly from the bottom of the journal box to secure the lower portion of the journal box holder to the truck frame.

The journal box holder is detachably secured to the truck frame by means of a bolt 13 located at one side of the box and passing through the wings 7 of the holder and also through the wings 4 which extend from the truck frame.

From the foregoing it will be understood that the journal box holder is secured to the upper and lower portions of the journal box through the medium of the pins 10 and 12, and that said holder is secured to the truck frame through the medium of the pins 10 and 12 which extend upwardly from the top of the journal box and also through the medium of the bolt 13.

The journal box and its holder may be removed from the truck frame by removing the bolt 13 and then lifting the truck frame a slight distance to release it from the pins 10 and 12.

The weight of the car body and truck frame tends to retain the upper portion of the journal box holder in its operative position between the top of the journal box and the truck frame, and the pins 10 and 12 are retained in their operative positions by the enlarged collars 10' and 12' which lie between the top of the journal box and the truck frame.

The truck frame B shown in Fig. III is a casting provided with a lug 4ª for the reception of a vertical bolt 13ª which passes through an extension 7ª formed on the journal box holder C. The journal box holder comprises a vertical pocket 7ᵇ adapted to receive the lugs 6ª at one side of the journal box, an upper extension 8ª seated on the top of the journal box A' and a lower member 9ª located below the journal box.

10ª and 12ª designate vertical pins fitted to the journal box and extending upwardly from the top of the member 8ª so as to interlock with the journal box holder with the truck frame.

This journal box holder is open at one side to receive the journal box, and it is secured to the journal box through the medium of the vertical pins 10ª and 12ª.

I claim:

1. A car truck provided with a side frame, a journal box; and a journal box fastener comprising a journal box holder adapted to receive said journal box, said journal box holder having an upper member arranged transversely of the journal box and a side member extending downwardly from said upper member so as to engage a side of the journal box, said upper member being located over the top of the journal box, and means for detachably securing said journal box holder to said side frame so as to permit the removal of the journal box from said frame.

2. A car truck frame provided with a journal box holder, a journal box, said journal box holder being secured to both the journal box and truck frame at points above the journal box, and a fastening device securing said holder to the truck frame at one side of the journal box.

3. A car truck frame provided with a journal box, a journal box holder seated on the top of said journal box, said truck frame being seated on said journal box holder, means for securing said journal box holder between the truck frame and the top of the journal box, and a detachable fastening device securing said holder to said truck frame, said detachable fastening device being located in a plane below the plane on the top of the journal box.

4. A car truck frame provided with a journal box, a journal box holder, said journal box holder being interlocked with the upper portion of the journal box and also with the truck frame at a point above the journal box, and a detachable fastening device securing said journal box holder to the truck frame.

5. A car truck frame provided with a journal box having vertical openings at its sides, a journal box holder seated on the top of said journal box, said journal box holder having pins which extend downwardly into said openings, and a fastening device detachably securing said journal box holder to said truck frame.

6. A car truck frame provided with a journal box, a journal box holder located partly above the top of the journal box and interlocked with the upper portion of said journal box, said journal box holder being provided with pins which extend into the truck frame at points above the journal box, and a fastening device detachably securing said journal box holder to said journal box.

7. A car truck frame provided with a journal box, a journal box holder arranged between the top of the journal box and a portion of the frame, vertical pins passing through said journal box holder and fitted to both the truck frame and journal box, and a fastening device located at one side of the journal box so as to secure said journal box holder to said truck frame.

8. A car truck frame provided with a journal box, a journal box holder having an upper member which lies above the journal box and a lower member below the journal box, means for securing said upper and lower members to the journal box, and means for detachably securing said journal box holder to said truck frame.

9. A car truck frame provided with a journal box having vertical openings at its sides, a journal box holder having an upper member which lies above the journal box and a lower member below the journal box, pins extending from said openings and securing said upper and lower members to the journal box, and means for detachably securing said journal box holder to said truck frame.

10. A car truck frame provided with a journal box having vertical openings at its sides, a journal box holder having an upper member which lies above the journal box and a lower member below the journal box, pins extending from said openings and securing said upper and lower members to the journal box, said pins being interlocked with the truck frame, and means for detachably securing said journal box holder to said truck frame.

11. A car truck frame provided with a journal box having openings at its sides, a journal box holder having an upper extension which lies above the journal box and a lower extension below the journal box, pins arranged in said openings and extending from the upper portion of the journal box so as to pass through said upper extension and into the truck frame, one of said pins being extended through said lower extension, and a detachable fastening device securing said journal box holder to the truck frame at one side of the journal box.

12. A car truck frame provided with a journal box, a journal box holder, and a fastening device including a pin fitted to said journal box and journal box holder, said pin having an enlarged portion which lies between the journal box and a portion of said frame.

13. A car truck having a frame provided with a journal box, a journal box holder, a portion of said journal box holder being located between the top of said journal box and a portion of the truck frame, and a fastening device including a vertical pin fitted to all of said parts, said vertical pin being provided with an enlarged portion which lies in said journal box holder at a point between said journal box and truck frame.

14. A journal box provided with a holder which is open at one side to receive the journal box, means for fastening said holder to the upper portion and to one side of the journal box, and means for detachably securing said holder to a truck frame.

15. A journal box provided with a holder which is open at one side to receive the journal box, means for fastening said holder to the top and bottom of the journal box, and a fastening device for securing said holder to the truck frame, said fastening device being fitted to said holder at one side of the journal box.

WILLIAM D. LOWRY.

Copies of this patent may be obtained for five cents each, by addressing the "Commissioner of Patents, Washington, D. C."